United States Patent
Parmar et al.

(10) Patent No.: US 11,258,711 B2
(45) Date of Patent: Feb. 22, 2022

(54) SPLIT-BRAIN PREVENTION IN A HIGH AVAILABILITY SYSTEM DURING WORKLOAD MIGRATION

(71) Applicant: VMware, Inc., Palo Alto, CA (US)

(72) Inventors: Ankit Parmar, Santa Clara, CA (US); Dileep Devireddy, San Jose, CA (US); Subin Cyriac Mathew, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/893,170

(22) Filed: Jun. 4, 2020

(65) Prior Publication Data

US 2021/0385164 A1 Dec. 9, 2021

(51) Int. Cl.
| | |
|---|---|
| *H04L 1/00* | (2006.01) |
| *H04L 47/125* | (2022.01) |
| *H04L 47/762* | (2022.01) |
| *H04L 45/00* | (2022.01) |
| *H04L 45/021* | (2022.01) |
| *H04L 47/78* | (2022.01) |

(52) U.S. Cl.
CPC .......... *H04L 47/125* (2013.01); *H04L 45/021* (2013.01); *H04L 45/20* (2013.01); *H04L 47/762* (2013.01); *H04L 47/781* (2013.01)

(58) Field of Classification Search
CPC ..... H04L 47/125; H04L 45/021; H04L 45/20; H04L 47/762; H04L 47/781
See application file for complete search history.

(56) References Cited

U.S. PATENT DOCUMENTS

| | | | |
|---|---|---|---|
| 9,178,816 B1 * | 11/2015 | Ojha | H04L 45/02 |
| 9,503,321 B2 | 11/2016 | Neginhal et al. | |
| 10,237,123 B2 * | 3/2019 | Dubey | H04L 45/28 |
| 10,484,302 B2 | 11/2019 | Hira et al. | |
| 10,530,634 B1 | 1/2020 | Fan et al. | |
| 2017/0142012 A1 * | 5/2017 | Thakkar | H04L 45/586 |
| 2018/0176073 A1 * | 6/2018 | Dubey | H04L 41/0672 |
| 2019/0068500 A1 * | 2/2019 | Hira | H04L 49/354 |
| 2019/0182145 A1 * | 6/2019 | Yan | H04L 45/745 |
| 2019/0306036 A1 * | 10/2019 | Boutros | H04L 43/10 |
| 2020/0014557 A1 * | 1/2020 | Wang | H04L 45/22 |

\* cited by examiner

*Primary Examiner* — Abdelnabi O Musa

(57) ABSTRACT

In some embodiments, a method receives a control message from a second host. The control message includes a first address to use as a next hop to reach an active workload that has migrated to the second host from another host. The method reprograms a local route table to include a policy to send packets to check a liveness of the active workload with the next hop of the first address. A packet is sent from a standby workload to the active workload using the next hop of the first address to check the liveness of the active workload. The packet is encapsulated and sent between the first host and the second host using an overlay channel between a first endpoint of the overlay channel on the first host and a second endpoint of the channel on the second host.

21 Claims, 7 Drawing Sheets

Before migration

After migration 112-3

| Traffic Policy | Next Hop |
|---|---|
| 10.1.1.100 +BFD | 169.2.2.1 |
| Default | 20.1.1.1 |

112-3

| Traffic Policy | Next Hop |
|---|---|
| 10.1.1.100 +BFD | 169.2.2.2 |
| Default | 20.1.1.1 |

Before migration

After migration 112-2

| Traffic Policy | Next Hop |
|---|---|
| 10.1.1.100 +BFD | 169.2.2.1 |
| 10.1.1.200 +BFD | 169.2.2.3 |
| Default | 20.1.1.1 |

604

112-2

| Traffic Policy | Next Hop |
|---|---|
| 10.1.1.200 +BFD | 169.2.2.3 |
| Default | 20.1.1.1 |

FIG. 6B

After migration

Before migration 112-1

| Traffic Policy | Next Hop |
|---|---|
| 10.1.1.200 +BFD | 169.2.2.3 |
| Default | 20.1.1.1 |

112-1

| Traffic Policy | Next Hop |
|---|---|
| 10.1.1.100 +BFD | 169.2.2.2 |
| 10.1.1.200 +BFD | 169.2.2.3 |
| Default | 20.1.1.1 |

SPLIT-BRAIN PREVENTION IN A HIGH AVAILABILITY SYSTEM DURING WORKLOAD MIGRATION

BACKGROUND

A high availability (HA) system is resilient to failures of the system's components. Typically, this is achieved by providing redundant components so that if one component fails, a redundant component can take over performing the tasks of the failed component. High availability devices, such as edge services gateways, may be grouped into clusters. The nodes in a cluster may work as a team to provide services even if some of the nodes fail. As long as at least one of the nodes in a cluster remains active, the cluster may provide the services configured on the nodes. Examples of the services may include load balancing, traffic forwarding, data packet processing, virtual private network (VPN) services, domain name system (DNS) services, and the like. Nodes in a cluster may operate in either an active mode or a standby mode. If a node that is designated as the active node in a cluster fails, then, if possible, a surviving standby node assumes the active role and provides the services that were configured on the failed node.

When the system is hosted on a public cloud, the system may include multiple workloads that are running on multiple hypervisors. In some examples, the cloud provider may offer only Layer 3 (L3) connectivity via an underlay infrastructure between the hosts. When there is a migration of an edge services gateway workload, such as an active edge services gateway workload, from a first host to a second host, a process is responsible for programming the new location of the edge services gateway workload in an underlay route table for the L3 network. The process may propagate the update to the underlay infrastructure to update the underlay route table. However, the underlay infrastructure may not immediately update the underlay route table. For example, the cloud provider may have implemented application programming interface (API) throttling, which can result in delay in realizing the routing update in the underlay network. The throttling may cause a delay in updating the underlay route table, such as a delay greater than the heartbeat timeout of the high availability system. During this time, the active edge services gateway workload has migrated from the first host to the second host. However, a standby edge services gateway workload may have sent a heartbeat packet to the active edge services gateway workload, but the underlay route table has not been updated and the heartbeat packet is sent to the first host. Because the active edge services gateway workload is not located in the first host, the active edge services gateway workload does not receive the heartbeat packet. Depending on the protocol used, not receiving the heartbeat packet may cause the standby edge services gateway workload to consider the active edge services gateway workload as not being available. For example, there may be various conditions that need to be met for failure to be declared, such as one or more consecutive heartbeat packets are not received. Due to the throttling, the condition may be met and the standby edge services gateway workload may then assume the active role. However, the active edge services gateway workload is still active on the second host. When this occurs, a split-brain condition occurs where there are two active edge services gateway workloads. The split-brain condition may result in network disruption, which could lead to loss of connectivity to all devices of the network (e.g., workloads and management devices), or other problems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 6A shows the change in entries in a local route table in host #3 according to some embodiments.

FIG. 6B shows the change in entries in a local route table in host #2 according to some embodiments.

FIG. 6C shows the change in entries in a local route table in host #1 according to some embodiments.

DETAILED DESCRIPTION

Figure 1:
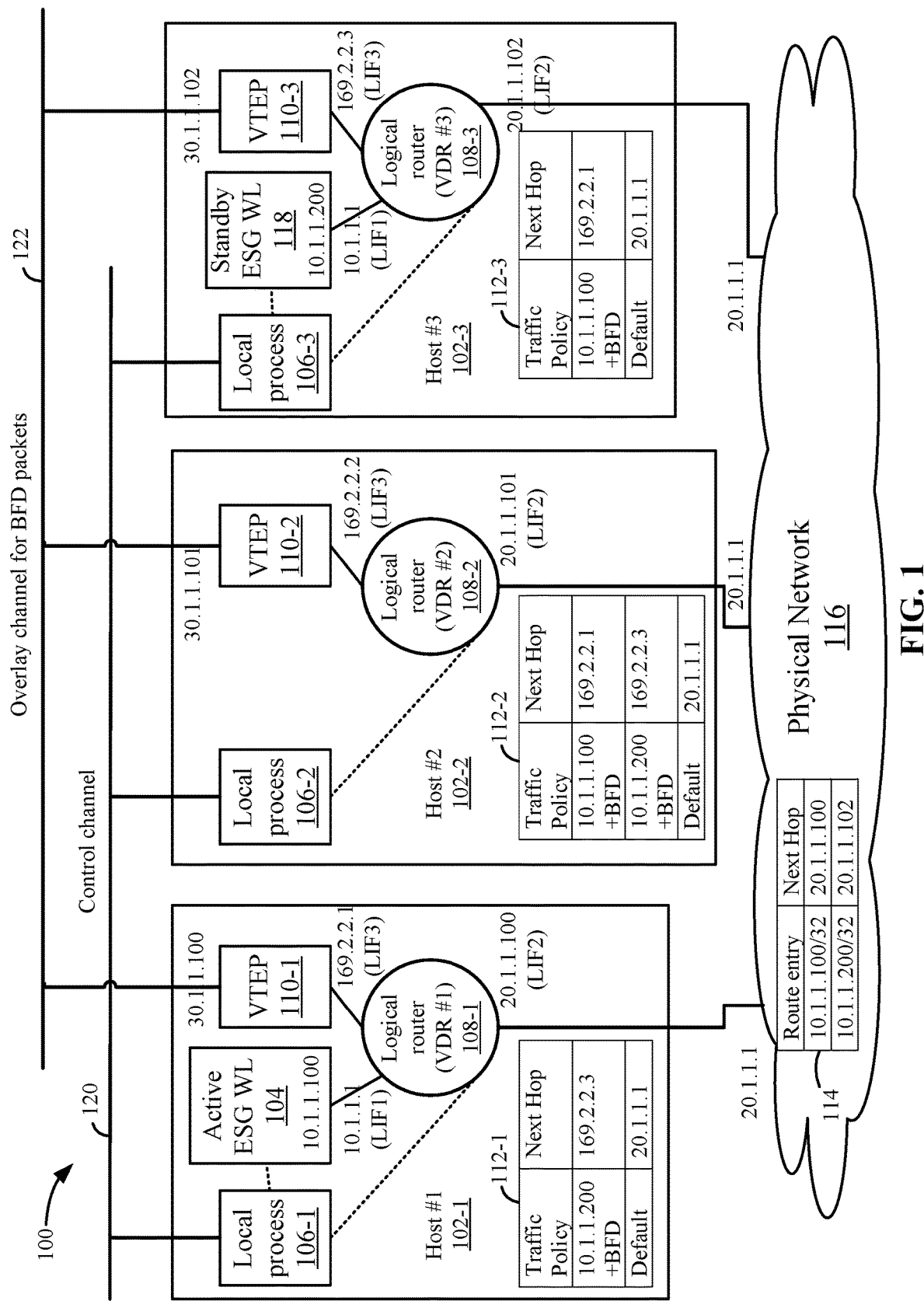
FIG. 1 depicts a simplified system for preventing split-brain conditions according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should not be construed as limiting in any way.

To overcome the above problems when migrating active edge services gateway (ESG) workloads, a system may set up a control channel and for local processes from hosts to communicate and a bi-directional forwarding detection (BFD) channel for sending packets per a protocol, such as the bi-directional forwarding detection protocol. In some embodiments, the control channel can be an overlay segment that spans across all hypervisors in the system. The local processes may use the control channel to communicate changes in traffic policies to reach edge services gateway workloads. The system may also configure a logical segment, which may be a BFD overlay channel, that spans the hypervisors in the system to carry BFD packets to check the liveness between edge services gateway workloads. The BFD protocol may be used to detect failures in edge services gateway workloads, but other protocols may be used.

Whenever a local process detects an edge services gateway workload being placed on a host, the local process may send a broadcast message over the control channel to advertise the traffic policy for sending the BFD packets to the respective edge services gateway workload. The traffic policy may specify where BFD packets for the edge services gateway workload need to be forwarded as a next hop. The local processes of other hosts may receive the message from the control channel and then program a traffic policy for the edge services gateway workload in the local route table of the host.

The above process is also used to advertise when an active edge services gateway workload migrates from a first host to a second host. The local process in the second host can broadcast the new traffic policy to reach the active edge services gateway workload in the second host. Other hosts then reprogram their local route tables with the new traffic policy. When BFD packets are to be sent to the active edge services gateway workload that has migrated to the second host, the host sending the BFD packet uses the traffic policy in the local route table to send the BFD packets to the correct host via the BFD overlay channel. The host encapsulates the BFD packets and sends the BFD packets through the overlay channel. This routing of the BFD packets using the BFD overlay channel does not send the BFD packets unencapsulated and subject to underlay routing using the underlay route table of the underlay network. Accordingly, any delays to the updating of the underlay route table used in the underlay network do not affect the receipt of the BFD packets because the BFD process is decoupled from the changes in the underlay route table. The endpoints of the BFD overlay channel do not change due to the migration of the active edge services gateway workload and this does not require any changes to the underlay route table for the BFD overlay channel.

The above use of the control channel and BFD overlay channel provides many advantages. For example, the use of the control channel and the BFD overlay channel may avoid a split-brain condition where multiple edge services gateway workloads become active due to delays in updating the underlay route table. Also, due to the problem discussed in the Background, if the throttling of APIs to update the underlay route table typically takes three to five seconds, an administrator may have to extend the BFD failure condition to be above five seconds. That is, a standby edge services gateway waits at least five seconds for a response to one of the BFD requests to determine whether the active edge services gateway workload is live or not. However, using the control channel and overlay channel, the failure condition may be reduced to under three seconds.

System Overview

FIG. 1 depicts a simplified system 100 for preventing split-brain conditions according to some embodiments. System 100 includes three hosts #1 to #3 102-1 to 102-3; however, a different number of hosts may be used. Hosts 102 may be used to implement logical routers, logical switches, and workloads. Hosts 102 may be referred to as computing devices, host computers, host devices, physical servers, server systems, or physical machines. Each host 102 may be configured to support multiple workloads. Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized. Also, the term "workload" may refer to a host that is not virtualized.

Among the workloads, hosts 102 may support an active edge services gateway workload (active ESG WL) 104 and a standby edge services gateway workload (standby ESG WL) 118. Edge services gateway workloads may be in a position of the network to route north-south traffic to workloads in a data center from an external network or from the workloads to the external network. Edge services gateways are described for discussion purposes; however, other workloads that are in a high availability system may be used in the described process and do not need to be at the position of a network to route north-south traffic. Accordingly, the following concepts may be applied to any workloads in an active-standby configuration and do not need to be used by devices routing north-south traffic.

Active edge services gateway workload 104 is designated as the active device to route north-south network traffic. Active edge services gateway workload 104 may also provide stateful services for network traffic at a position of the network to process north-south traffic. Standby edge services gateway workload 118 is designated as a standby device that can take over as active device when standby edge services gateway workload 118 determines that active edge services gateway workload 104 has failed. Although a single active edge services gateway workload and a single standby edge services gateway workload, it is noted that other configurations for high availability may be appreciated. Also, it is noted that additional workloads (not shown) may be supported by hosts 102, which may or may not be edge services gateway workloads.

The hypervisors of hosts 102 may be configured to implement logical switches and forwarding tables that connect workloads together and facilitate sending data traffic between workloads on a logical network. Also, the hypervisor may implement a logical router to connect logical switches to each other and to the external network. In some examples, each host 102 may implement a respective local logical router, which is an instance of a logical router that is located only locally to the host. For example, host #1 102-1 implements a logical router (virtual distributed router VDR #1) 108-1, host 102-2 implements a logical router (VDR #2) 108-2; and host #3 102-3 implements a logical router (VDR #3) 108-3. These local logical routers may not be edge services gateway routers and may be local to each host 102. The local logical routers route traffic for each respective host 102, such as between edge services gateway workloads and other workloads. Examples of logical switches and logical routers may be found in U.S. Pat. No. 9,503,321, filed on Mar. 21, 2014 and U.S. Pat. No. 10,484,302, filed on Aug. 31, 2016, which claims priority to U.S. Provisional Application No. 62/380,411, filed on Aug. 27, 2016, all of which are incorporated by reference in their entirety.

A provider, such as a public cloud provider, may offer Layer 3 network connectivity between hosts 102 that may be referred to as an underlay network in physical network 116. The logical network may run on top of the underlay infrastructure. The public cloud vendor of a data center may restrict the use of the Layer 2 addresses (e.g., media access controller (MAC) addresses) of interfaces to those managed by the public cloud provider. This may limit movement of MAC addresses that interface with the underlay infrastructure natively. However, using logical router 108 allows a tenant of the data center to have workloads with different MAC addresses that are not assigned by the public cloud provider and also to migrate workloads from one host to another host. In this example, logical routers 108 include an interface, such as a logical interface LIF2, that is coupled to the underlay infrastructure. Also, logical router 108 includes a MAC address that is provided by the public cloud provider. The interface for logical router 108 may have only have one MAC address and the MAC address is not be moved across interfaces. However, logical router 108 may manage MAC addresses for workloads situated behind logical router 108. For example, when logical router 108 receives a packet from a workload and sends the packet to the underlay, logical router 108 can translate the source MAC address of a packet that is assigned by the tenant to the workload to the MAC address that is assigned to logical router 108 by the cloud provider. When packets are received from the underlay at the MAC address that is assigned to logical router 108, logical router 108 changes the destination MAC address to the MAC address of the workloads based on the destination IP address. The above allows movement of workloads for the tenant within the network.

In this example, logical routers 108 have logical interfaces coupled to workloads and virtual tunnel endpoints (VTEPs). For example, logical router 108-1 includes logical interfaces of a first logical interface LIF1 with an IP address of 10.1.1.1 that is coupled to active edge services gateway workload 104 and a third logical interface LIF3 with an IP address of 169.2.2.1 that is coupled to a VTEP 110-1. Also, logical router 108-2 includes a third logical interface LIF3 with an IP address of 169.2.2.2 for VTEP 110-2. Host #2 102-2 does not include an active edge services gateway workload or a standby edge services gateway workload. Logical router 108-3 includes a first logical interface LIF1 has an IP address of 10.1.1.1 for standby edge services gateway workload 118 and a third logical interface LIF3 with an IP address of 169.2.2.3 for VTEP 110-3.

Underlay route table 114 may include route entries that route packets to the IP addresses for interfaces coupled to the underlay network. For example, logical router 108-1 may have an IP address for a second logical interface LIF2 of 20.1.1.100, logical router 108-2 may have an IP address for a second logical interface LIF2 of 20.1.1.101, and logical router 108-3 includes a second logical interface LIF2 with an IP address of 20.1.1.102. Also, the underlay network includes an interface with an IP address of 20.1.1.1. In some examples, north-south traffic may be routed using underlay route table 114. For example, workloads on respective hosts 102 send packets to active edge services gateway workload 104 for an external network via the underlay network and the LIF2 interface of a logical router. Or, packets received by active edge services gateway workload 104 from the external network are sent to workloads via the underlay network and the LIF2 interface of a logical router.

Active edge services gateway workload 104 and a standby edge services gateway workload 118 typically run a failure detection process that may involve sending messages (e.g., heartbeat messages) between themselves using a protocol, such as BFD. Although the BFD protocol and BFD packets are discussed, other protocols may be used. The failure detection process is employed to make sure services provided by active edge services gateway workload 104 are always available. However, as discussed above, a problem may result when a split-brain condition occurs where both active edge services gateway workload 104 and standby edge services gateway workload 118 are active at the same time. The split-brain condition may result in network disruption, which could lead to loss of connectivity to all devices of the network (e.g., workloads and management devices). As discussed in the Background, when using underlay route table 114 to route BFD packets, standby edge services gateway workload 118 may send a BFD packet to the IP address of active edge services gateway workload 104. The underlay determines the next hop for the destination IP address as the LIF2 interface of logical router 108-1. Logical router 108-1 then sends the BFD packet to active edge services gateway workload 104. However, when active edge services gateway workload 104 migrates to another host, such as host #2 102-2, the route for active edge services gateway workload 104 in underlay route table 114 needs to be re-programmed from the LIF2 interface of logical router 108-1 on host #1 102-1 to the LIF2 interface of logical router 108-2 on host #1 102-2. This is where the delay in re-programming occurs as discussed in the Background and can result in the split-brain condition.

The following describes the use of a control channel and a BFD channel to prevent BFD packet loss, such as when migration of active edge services gateway workload 104 occurs. The use of the control channel and the BFD channel eliminates the dependency on re-programming underlay route table 114, which avoids the delays associated with the re-programming.

Hosts 102 configure a control channel 120 to allow local processes 106-1 to 106-3 on respective hosts 102 to communicate among each other. In some embodiments, the control channel may be an overlay segment that spans across all hypervisors of hosts 102. However, other types of control channels may be used.

A local process 106 on each respective host 102 discovers workloads on each respective host 102 and populates traffic policies in local route table 112 for a respective host 102. Local route table 112 may include traffic policies that define next hops in a path to reach the workloads managed by the tenant. Local processes 106 broadcast the traffic policies for workloads to other hosts 102 via control channel 120. Local process 106 may also send an update to an underlay route table 114 that is used to route network traffic sent by workloads to active edge services gateway workload 104 for the external network or network traffic from the external network to workloads (e.g., not BFD packets). Local processes 106 use control channel 120 to communicate changes to a traffic policy when a migration of active edge services gateway workload 104 occurs.

Hosts 102 also configure a logical segment, such as an overlay channel, for carrying BFD traffic between edge services gateway workloads. The BFD traffic may be BFD packets that are sent to check the liveness of an edge services gateway workload, such as an active edge services gateway workload 104, via BFD overlay channel 122. BFD overlay channel 122 is then used to send the BFD packets from active edge services gateway workload 104 and standby edge services gateway workload 118. BFD overlay channel 112 may configure VTEPs 110-1 to 110-3 as the endpoints for a tunnel to implement the overlay. Each respective VTEP 110 may have an IP address that is used as a source address or a destination address for encapsulated packets that are sent over overlay channel 122. For example, VTEP 110-1 may have an IP address of 30.1.1.100; VTEP 110-2 may have an IP address of 30.1.1.101; and VTEP 110-3 may have an IP address of 30.1.1.102. Local process 106 may populate the IP addresses in underlay route table 114 to enable routing of encapsulated packets for BFD overlay channel 122.

In some embodiments, BFD overlay channel 122 is used to ensure the BFD packets are delivered without relying on re-programming underlay route table 114 in the underlay network when migration of active edge services gateway workload 104 occurs. The re-programming is not needed because the IP addresses of VTEPs 110 do not change when a migration of active edge services gateway workload 104 occurs. Since the endpoints of BFD overlay 112 do not change, underlay route table 114 does not need to be reprogrammed to route packets via BFD overlay 122. That is, routes in underlay route table 114 for VTEPs 110 are not changed when a migration occurs.

The following will first describe the configuration of local route tables 112 when edge services gateway workloads are installed on hosts 102. The general BFD process will be described and then the use of control channel 120 and BFD overlay channel 122 to detect liveness will be described.

Configuration of the Local Route Table

Figure 2:
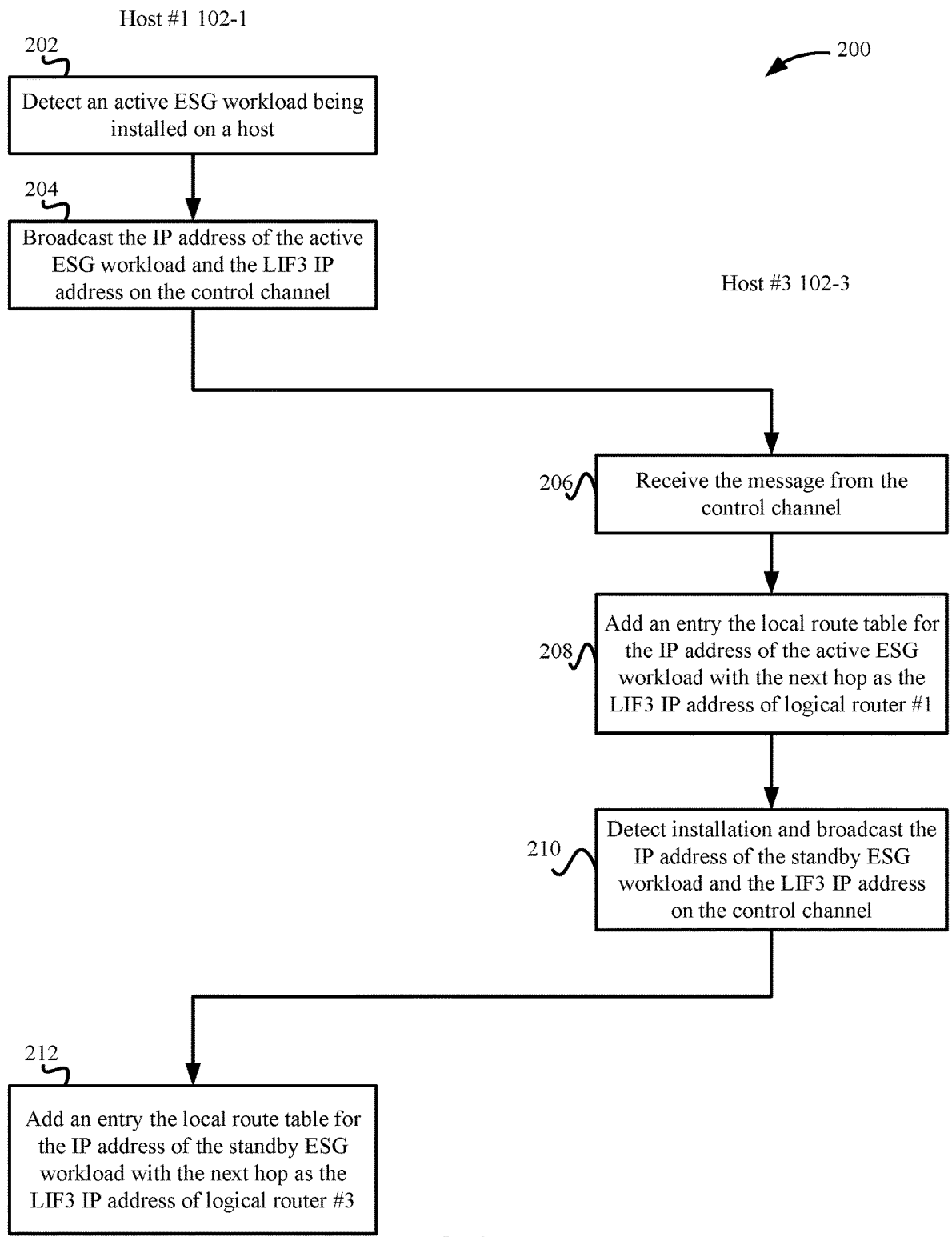
FIG. 2 depicts a simplified flowchart of a method for populating traffic policies for workloads according to some embodiments.

After setting up control channel 120 and overlay channel 122, local processes 106 may populate local route tables 112 with traffic policies for BFD packets. FIG. 2 depicts a simplified flowchart 200 of a method for populating traffic policies for workloads according to some embodiments. The method may be described with respect to a host #1 102-1 and a host #3 102-3. However, the hosts may communicate with all other hosts on the network. The method will describe the installation and detection of active edge services gateway workload 104 and then standby edge services gateway workload 118.

At 202, local process 106-1 detects an edge services gateway workload being installed on host #1 102-1. For example, local process 106-1 may monitor and detect when an IP address for an edge services gateway workload is placed on host #1 102-1. In this case, the edge services gateway workload is active edge services gateway workload 104.

Active edge services gateway workload 104 is installed and coupled to interface LIF3 of logical router 108-1. Then, at 204, local process 106-1 broadcasts the IP address of active edge services gateway workload 104 and the logical interface IP address in which active edge services gateway workload 104 is connected using control channel 120. The logical interface IP address is the IP address to use when sending encapsulated BFD packets that are destined for the IP address of active edge services gateway workload 104. For example, local process 106-1 may advertise the route <BFD, 10.1.1.100→169.2.2.1> to all hosts 102. The use of "BFD" indicates to other hosts that this route is for BFD packets. The IP address 10.1.1.100 is the IP address of active edge services gateway workload 104 and the IP address 169.2.2.1 is the logical interface to which BFD packets should be directed as a next hop to reach the destination of active edge services gateway workload 104.

At host #3 102-3, at 206, local process 106-3 receives the message from control channel 120. In some embodiments, an overlay may be used that could encapsulate and decapsulate the control packets being sent between local processes 106. In this case, VTEPs may be endpoints of control channel 120 and encapsulate/decapsulate control messages sent between hosts 102. However, different types of control channel configurations may be used.

At 208, local process 106-3 adds an entry in local route table 112-3 for the IP address of the edge services gateway workload with the next hop as IP address of the logical interface LIF3 of logical router 108-1. For example, local process 106-3 programs a traffic policy that indicates BFD packets sent to the IP address of 10.1.1.100 should be sent to the next hop of the IP address of 169.2.2.1.

Similarly, local process 106-3 may detect workloads being installed on host #3 102-3. For example, at 210, local process 106-3 detects the installation of standby edge services gateway workload 118 and broadcasts the IP address of standby edge services gateway workload 118 and the IP address of the logical interface LIF3 for logical router 108-3 on control channel 120. For example, local process 106-3 may advertise the route <BFD, 10.1.1.200→169.2.2.3> over control channel 120. Similar to above, the control message indicates the IP address of standby edge services gateway workload 118 with a next hop of the IP address 169.2.2.3 in which packets for standby edge services gateway workload 118 should be directed to reach standby edge services gateway workload 118.

At 212, local process 106-1 in host 102-1 receives the control packet and adds an entry in local route table 112-1 for the IP address of standby edge services gateway workload 118 with the next hop as the logical interface IP address of logical router 108-3. As can be seen, local route table 112-1 includes a traffic policy for BFD packets with the IP address of 10.1.1.200 and a next hop of the IP address 169.2.2.3. Using this traffic policy, logical router 108-1 sends BFD packets that are sent to the IP address of 10.1.1.200 to the next hop IP address of 169.2.2.3 for logical router 108-3. Logical router 108-3 can then forward the BFD packets to standby edge services gateway workload 118 at the IP address of 10.1.1.200.

BFD Process

Figure 3:
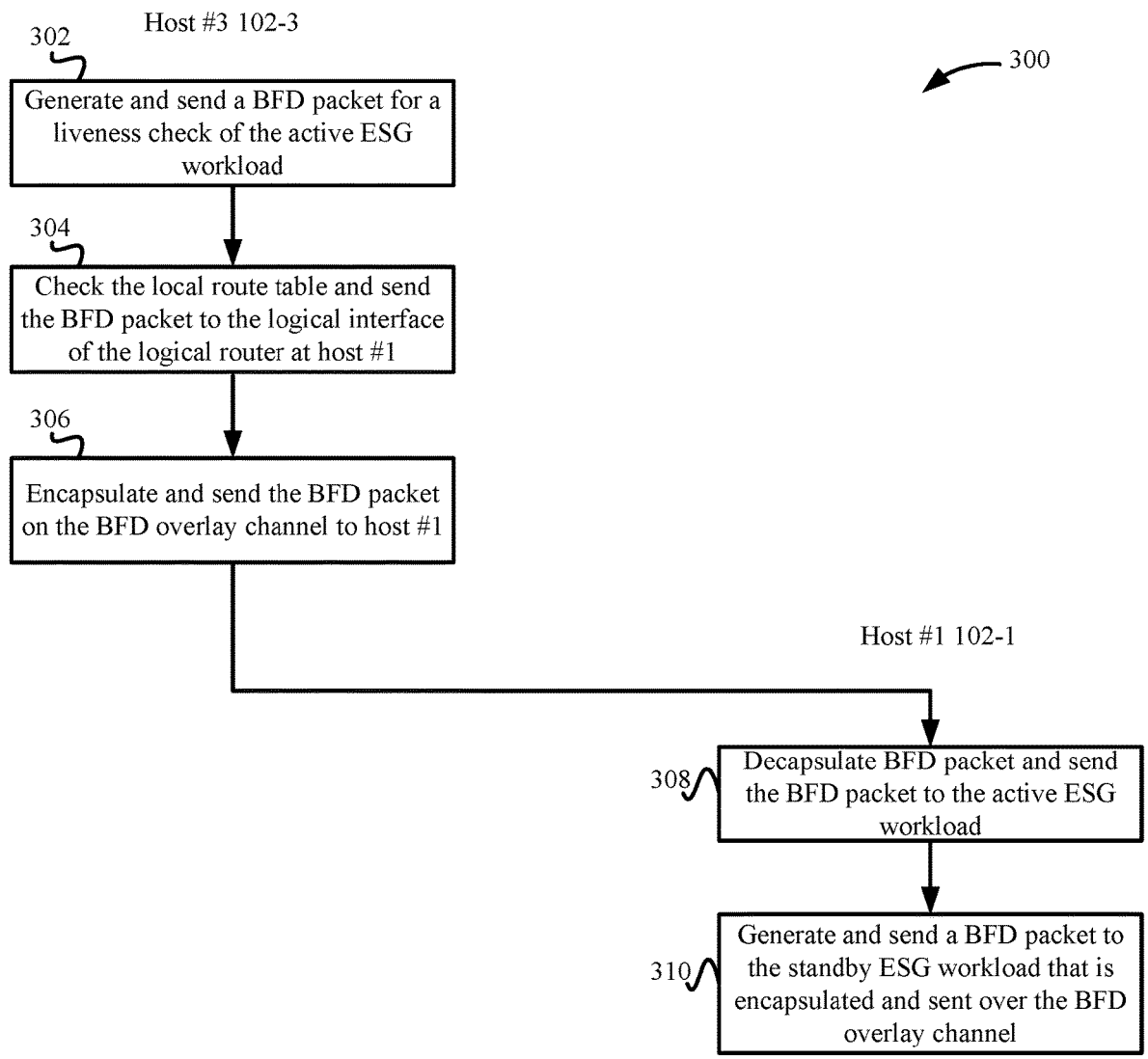
FIG. 3 depicts a simplified flowchart of a method for sending bidirectional forwarding detection (BFD) packets to detect liveness according to some embodiments.

Once configuring local route tables 112 with the traffic policies for BFD packets, active edge services gateway workload 104 and standby edge services gateway workload 118 send BFD packets to each other. FIG. 3 depicts a simplified flowchart 300 of a method for BFD packets to detect liveness according to some embodiments. Different protocols may be used to detect liveness of active edge services gateway workload 104. The following process uses the BFD protocol, but other protocols that may detect false positives of a failure due to the migration and the delay in reprogramming of underlay route table 114 may be used. In the BFD protocol, peers may establish a BFD session that send BFD packets bidirectionally at determined intervals. A mechanism may be used to indicate whether a BFD packet was successfully received. For example, if a BFD packet is received at active edge services gateway workload 104, active edge services gateway workload 104 would set a state variable to indicate that the BFD packet from standby edge services gateway workload 118 was received. If the BFD packet was not received, active edge services gateway workload 104 would set a state to indicate that the BFD packet was not received. When a condition is met for a failure, the BFD session is torn down. At this point, standby edge services gateway workload 118 may determine that active edge services gateway workload 104 has failed and may take over as the active edge services gateway. In some examples, the condition may be when one or more BFD packets have not been received at any peer. In the example in the Background, BFD packets are not received at active edge services gateway workload 104 and active edge services gateway workload 104 may tear down the BFD session, which causes standby edge services gateway workload 118 to determine that active edge services gateway workload 104 has failed.

At 302, standby edge services gateway workload 118 in host 102-3 generates a BFD packet to check for the liveness of active edge services gateway workload 104. The BFD packet may include a source IP address of 10.1.1.200 for standby edge services gateway workload 118 and a destination IP address of 10.1.1.100 for active edge services gateway workload 104. Standby edge services gateway workload 118 sends the BFD packet to logical router 108-3.

At 304, logical router 108-3 checks local route table 112-3 to determine the traffic policy for the BFD packet. Local route table 112-3 includes a BFD policy that includes a next hop for the IP address of active edge services gateway workload 104. For example, when local router 108-3 receives a packet that is a BFD packet and has a destination IP address of 10.1.1.100, logical router 108-3 looks up the applicable policy in local route table 112-3. When logical router 108-3 finds the applicable BFD traffic policy, logical router 108-3 sends the packet to a next hop with the IP address of 169.2.2.1, which is the interface LIF3 of logical router 108-1 in which VTEP 110-1 is connected. Applying the traffic policy for the IP address of active edge services gateway workload 104, logical router 108-3 sends the BFD packet to the logical interface LIF3 of logical router 108-1 at host #1 102-1.

BFD overlay channel 120 is used to encapsulate and send the BFD packet to logical interface LIF3 of logical router 108-1 at host #1 102-1. For example, at 306, VTEP 110-3 encapsulates and sends the BFD packet over BFD overlay channel 122 to host #1 102-1. VTEP 110-3 can encapsulate the BFD packet with a source IP address of 30.1.1.102 for VTEP 110-3 and a destination address of 30.1.1.100 for VTEP 110-1. The encapsulated BFD packet is then routed via BFD overlay channel 122 to VTEP 110-1. Because the overlay channel is used, unencapsulated routing is avoided and unencapsulated BFD packets are not routed via underlay route table 114. Rather, the IP addresses of VTEP 110-1 and VTEP 110-2 are used to route the encapsulated packet using underlay route table 114.

At host #1 102-1, after receiving the request BFD packet from overlay channel 112, at 308, VTEP 110-1 decapsulates the packet and forwards the unencapsulated BFD packet to logical router 108-1 via the next hop IP address. Logical router 108-1 then forwards the BFD packet to active edge services gateway workload 104 using the destination IP address of 10.1.1.100 for the BFD packet. Note that the above explanation, and other explanations herein, may reflect a common interpretation or abstraction of actual processing mechanisms. For instance, packets may not actually be forwarded between entities in hosts, but may be stored in memory. It is conventional to refer to these packets as being sent between entities within hosts to abstract away complexity and explain higher level operations without burdening the reader with unnecessary technical details of well understood mechanisms. Such abstractions in the descriptions herein should not be construed as limiting in any way.

At 310, active edge services gateway workload 104 can generate and send a BFD packet. For example, at the determined time interval, active edge services gateway workload 104 sends the BFD packet to the IP address of 10.1.1.200 for standby edge services gateway workload 118. Logical router 108-1 receives the BFD packet and looks up the traffic policy for BFD packets with the IP address 10.1.1.200 in local route table 112-1. The traffic policy in local route table 112-1 includes the next hop of 169.2.2.3, which is the interface LIF3 of logical router 108-3 that is connected to VTEP 110-3. Similar to the process above, logical router 108-1 sends the packet to VTEP 110-1, which encapsulates the packet using the IP address of VTEP 110-3 as the destination IP address and IP address of VTEP 110-1 as the source IP address. VTEP 110-1 sends the response BFD packet over BFD overlay channel 122 to VTEP 110-3, which decapsulates the packet. Logical router 108-3 receives the BFD packet at the interface LIF3 of logical router 108-3, and can then send the BFD packet to standby edge services gateway workload 118 using the destination IP address. Similar to the BFD packet sent from standby edge services gateway workload 118 to active edge services gateway workload 104, the above routing does not depend on routing the unencapsulated BFD packet using underlay route table 114 of the underlay network.

Active Edge Services Gateway Workload Migration

Figure 4:
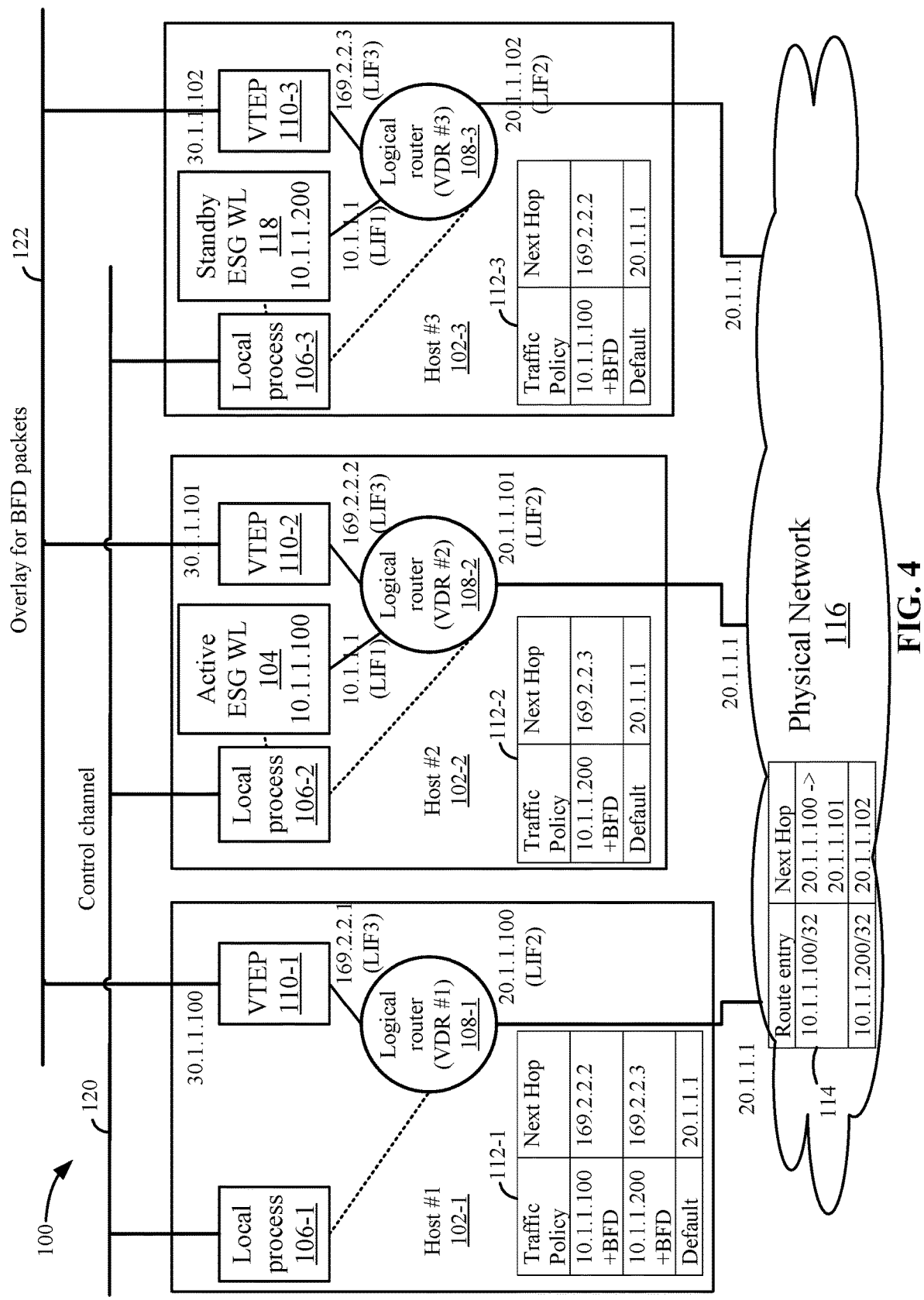
FIG. 4 depicts an example of system after migration of an active edge services gateway workload according to some embodiments.

The above process of sending BFD packets continues when active edge services gateway workload 104 migrates to another host 102. FIG. 4 depicts an example of system 100 after migration of active edge services gateway workload 104 according to some embodiments. At certain times (such as due to a distributed resource scheduler command to migrate), active edge services gateway workload 104 may migrate from a first host to a second host. As shown, active edge services gateway workload 104 has migrated, such as using VMOTION™, from host #1 102-1 to host #2 102-2. After migration, active edge services gateway workload 104 includes the same IP address 10.1.1.100 that was used on host #1 102-1. Active edge services gateway workload 104 is connected to the logical interface LIF2 of logical router 108-2 with the same IP address of 10.1.1.1. However, logical router 108-2 of host #2 102-2 now handles routing for BFD packets being sent and received by active edge services gateway workload 104. Accordingly, the next hop IP address to reach active edge services gateway workload 104 for BFD packets changes due to the migration. For example, VTEP 110-2 is connected to the logical interface LIF3 for logical router 108-2 with the IP address of 169.2.2.2. This IP address is different from the logical interface with the IP address of 169.2.2.1 that was used when an active edge services gateway workload 104 was running on host #1 102-1. Even though the logical interface for the next hop for BFD packets changes, the IP addresses that are used for VTEPs 110 to encapsulate and send BFD packets on BFD overlay 122 do not change due to the migration. For example, VTEP 110-2 still includes the same IP address 30.1.1.101 after the migration of active edge services gateway workload 104. That is, the endpoints of BFD overlay 122 are fixed and are not changed when the migration occurs. Accordingly, reprogramming of the underlay route table 114 is not needed for the BFD process because the endpoints of BFD overlay 120 are not changed. The changes for the BFD process due to the migration are reflected in local route table 112 instead.

Figure 5:
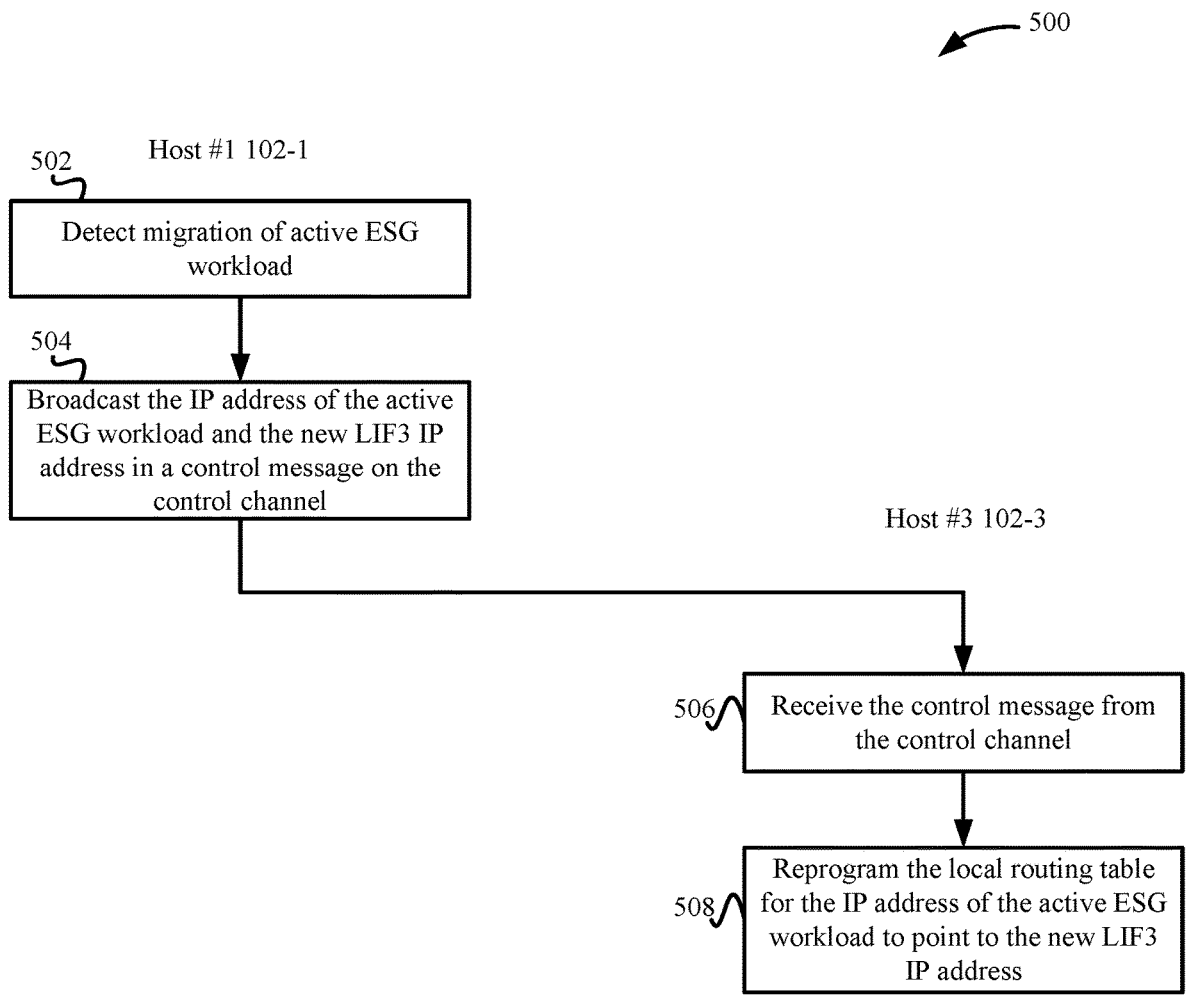
FIG. 5 depicts a simplified flowchart of a method for reconfiguring the system to forward BFD packets to the migrated active edge services gateway workload according to some embodiments.

To broadcast the migration, local process 106-2 may use control channel 120. FIG. 5 depicts a simplified flowchart 500 of a method for reconfiguring the system to forward BFD packets to the migrated active edge services gateway workload 104 according to some embodiments. At 502, local process 106-2 detects a migration of active edge services gateway workload 104. Then, at 504, local process 106-2 broadcasts the IP address of active edge services gateway workload 104 and the new logical interface IP address to use to send BFD packets as the next hop on control channel 120. For example, local process 106-2 may advertise the route <BFD, 10.1.1.100→169.2.2.2> to all hosts 102. The IP address of 10.1.1.100 is the IP address of active edge services gateway workload 104 and the IP address 169.2.2.2 is the logical interface for logical router 108-2 that is connected to VTEP 110-2. This policy is different from the policy used before the migration in that the IP address of the next hop is changed.

At 506, host #3 102-3 receives the control packet at local process 106-3 from control channel 120. At 508, local process 106-3 may reprogram local route table 106-3 to change the traffic policy for the IP address of active edge services gateway workload 104 to point to the new local logical interface IP address of logical router 108-2 as the next hop. If the address resolution protocol (ARP) mapping for the IP address 169.2.2.2 for logical router 108-2 is not yet resolved, host #3 102-3 can learn the media access control (MAC) addresses behind VTEP 110-2 at host #2 102-2 using different features. For example, host #3 102-3 may use ARP to learn the MAC address, such as using an ARP suppression feature to send the ARP request or may send out an ARP request to BFD overlay 120.

FIG. 6A shows the change in entries in local route table 112-3 according to some embodiments. At 602, the next hop for the IP address 10.1.1.100 is changed from 169.2.2.1 to 169.2.2.2. The local route tables of other hosts 102 are also updated based on the migration. For example, each local process may update its own local route table based on the broadcasted change in the traffic policy. FIG. 6B shows the change in entries in local route table 112-2 according to some embodiments. Before the migration, active edge services gateway workload 104 and standby edge services gateway workload 118 were on different hosts. Local route table 112-2 thus included a first BFD traffic policy <BFD, 10.1.1.100→169.2.2.1> for the next hop to active edge services gateway workload 104 and a second BFD traffic policy <BFD, 10.1.1.200→169.2.2.3> for a next hop to standby edge services gateway workload 104. At 604, local process 106-2 removes the first traffic policy <BFD, 10.1.1.100→169.2.2.1> for active edge services gateway workload 104 on host #1 102-1 because active edge services gateway workload 104 is now running on host #2 102-2. Accordingly, after the migration, local route table 112-2 includes a route to standby edge services gateway workload 104 of <BFD, 10.1.1.200→169.2.2.3>.

FIG. 6C shows the change in entries in local route table 112-1 according to some embodiments. Before migration, local route table 112-1 of host #1 102-1 includes active edge services gateway workload 104 and local route table 112-1 included a route to standby edge services gateway workload 118 of <BFD, 10.1.1.200→169.2.2.3>. However, after migration, active edge services gateway workload 104 is on a different host. Thus, at 606, local process 106-1 adds an entry in local route table 112-1 with a route to active edge services gateway workload 104 of <BFD, 10.1.1.10→0169.2.2.2.

Figure 7:
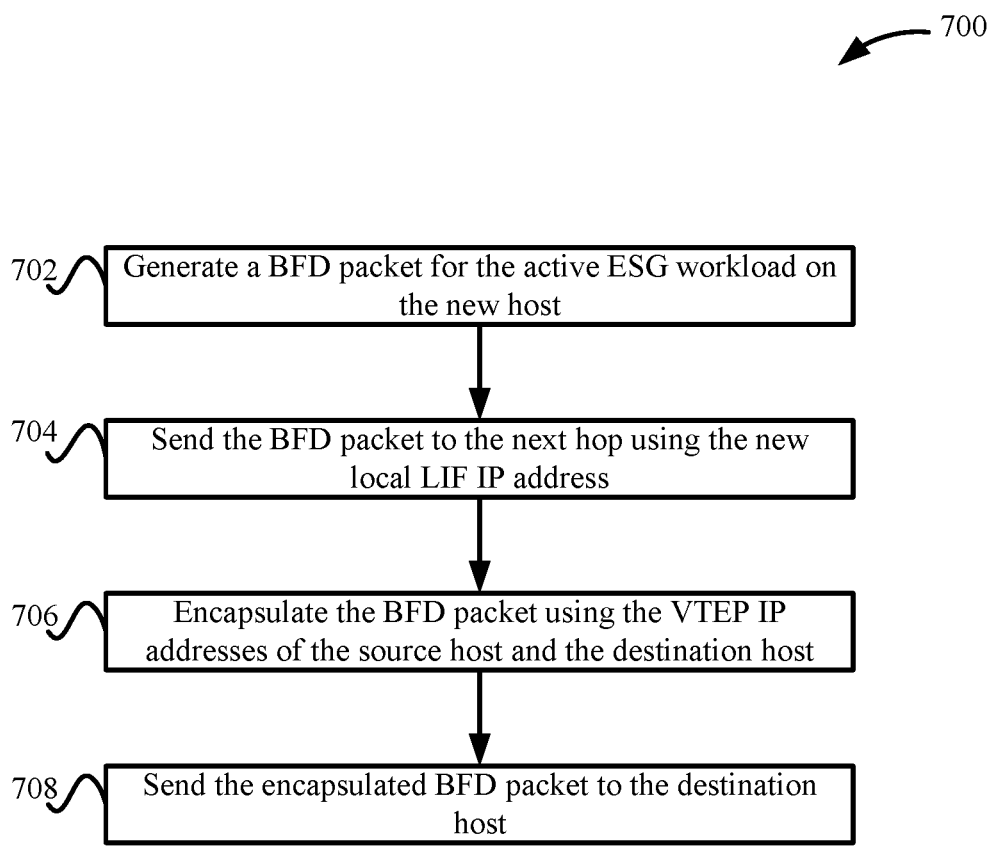
FIG. 7 depicts a simplified flowchart of a method for generating and sending a BFD packet at host #3 according to some embodiments.

After reconfiguration of local route tables 112, BFD packets continue to flow between hosts #2 102-2 and host #3 102-3. FIG. 7 depicts a simplified flowchart 700 of a method for generating and sending a BFD packet at host #3 102-3 according to some embodiments. At 702, standby edge services gateway workload 104 generates a BFD packet for the active edge services gateway workload on the new host. Logical router 108-2 receives the BFD packet and can look up the traffic policy for the IP address of active edge services gateway workload 104. The next hop for the IP address in local route table 112-2 has been changed to the IP address 169.2.2.2 for the logical interface LIF3 of logical router 108-2 on host #2 102-2. At 706, VTEP 110-3 encapsulates the BFD packet using the IP address of VTEP 110-3 as the source address and IP address of VTEP 110-2 as the destination address. At 708, VTEP 110-3 sends the encapsulated packet via BFD overlay 122. VTEP 110-2 receives the encapsulated packet, decapsulates the packet, and sends the BFD packet to logical router 108-2. Logical router 108-2 can then forward the BFD packet to active edge services gateway workload 104.

In the reverse direction, active edge services gateway workload 104 can send a BFD packet to standby edge services gateway workload 118 via BFD overlay channel 122. The next hop for standby edge services gateway workload 118 has not changed due to the migration and the traffic policy in local route table 112-2 is used to send BFD packets via BFD overlay channel 122 to standby edge services gateway workload 118 as described above.

Accordingly, the IP addresses of VTEP 110-2 and 110-3 do not change due to the migration of active edge services gateway workload 104. The BFD packets can thus continue to flow between host #2 102-2 and host #3 102-3 without relying on any change to underlay route table 114 due to the reprogramming of underlay route table 114. The BFD process decoupled from the re-programming of underlay route table 114, which prevents a split-brain condition during a migration event. For example, a local route table change can be communicated through the control channel, which does not rely on changes in underlay routing. Once the local route tables 112 have been reprogrammed, BFD packets can be sent and received through BFD overlay 122, which also does not rely on the underlay reprogramming because the IP addresses of VTEPs 110 do not change.

It is noted that underlay route table 114 may eventually be changed based on the migration. For example, the next hop for active edge services gateway workload 104 with the IP address 10.1.1.100/32 may be changed from 20.1.1.100 to 20.1.1.101. This changes the next hop from the logical interface LIF2 of logical router 108-1 to the logical interface LIF2 of logical router 108-2. The changing of the route entry in underlay route table 114 allows north/south packets sent from workloads in system 100 to active edge services gateway workload 104 to be routed to the external network, and from the external network to be routed to workloads in system 100. This does not result in a split-brain condition because the packets being routed in this case may be data traffic, such as packets that are not used in the BFD protocol.

Embodiments

In some embodiments, a method comprising: receiving, at a first host, a control message from a second host, wherein the control message includes a first address to use as a next hop to reach an active workload that has migrated to the second host from another host; reprogramming a local route table to include a policy to send packets to check a liveness of the active workload with the next hop of the first address; and sending a packet from a standby workload to the active workload using the next hop of the first address to check the liveness of the active workload, wherein the packet is encapsulated and sent between the first host and the second host using an overlay channel between a first endpoint of the overlay channel on the first host and a second endpoint of the channel on the second host.

In some embodiments, the packet includes a destination address of the active workload, and the destination address is used to look up the next hop of the first address in the local route table.

In some embodiments, addresses of the first endpoint and the second endpoint of the overlay channel do not change due to the migration of the active workload; and the encapsulated packet is sent through an underlay network using underlay route table that includes a route with the address of the second endpoint.

In some embodiments, the control message is received on a control channel that sends control messages between a first local process on the first host and a second local process on the second host, and the second local process reprograms the local route table.

In some embodiments, the packet comprises a first packet, the method further comprising: receiving an encapsulated second packet from the active workload for the standby workload through the overlay channel, wherein the second packet is sent using a next hop of a second address of an interface of a logical router that is coupled to the first endpoint on the first host.

In some embodiments, the local route table previously included a policy with the next hop of a second address to use to reach the active workload on the another host.

In some embodiments, the active workload is an active edge services gateway device that processes north-south traffic, and the standby workload is an edge services gateway device capable of becoming the active edge services gateway device upon determining a failure of the active workload using the liveness check of the active workload.

In some embodiments, a non-transitory computer-readable storage medium containing instructions, that when executed, control a computer system to be operable for: receiving, at a first host, a control message from a second host, wherein the control message includes a first address to use as a next hop to reach an active workload that has migrated to the second host from another host; reprogramming a local route table to include a policy to send packets to check a liveness of the active workload with the next hop of the first address; and sending a packet from a standby workload to the active workload using the next hop of the first address to check the liveness of the active workload, wherein the packet is encapsulated and sent between the first host and the second host using an overlay channel between a first endpoint of the overlay channel on the first host and a second endpoint of the channel on the second host.

In some embodiments, the packet includes a destination address of the active workload, and the destination address is used to look up the next hop of the first address in the local route table.

In some embodiments, addresses of the first endpoint and the second endpoint of the overlay channel do not change due to the migration of the active workload; and the encapsulated packet is sent through an underlay network using underlay route table that includes a route with the address of the second endpoint.

In some embodiments, the control message is received on a control channel that sends control messages between a first local process on the first host and a second local process on the second host, and the second local process reprograms the local route table.

In some embodiments, the packet comprises a first packet, the instructions further operable for: receiving an encapsulated second packet from the active workload for the standby workload through the overlay channel, wherein the second packet is sent using a next hop of a second address of an interface of a logical router that is coupled to the first endpoint on the first host.

In some embodiments, the local route table previously included a policy with the next hop of a second address to use to reach the active workload on the another host.

In some embodiments, the active workload is an active edge services gateway device that processes north-south traffic, and the standby workload is an edge services gateway device capable of becoming the active edge services gateway device upon determining a failure of the active workload using the liveness check of the active workload.

In some embodiments, a first host comprising: one or more computer processors; and a non-transitory computer-readable storage medium comprising instructions, that when executed, control the one or more computer processors to be operable for: receiving a control message from a second host, wherein the control message includes a first address to use as a next hop to reach an active workload that has migrated to the second host from another host; reprogramming a local route table to include a policy to send packets to check a liveness of the active workload with the next hop of the first address; and sending a packet from a standby workload to the active workload using the next hop of the first address to check the liveness of the active workload, wherein the packet is encapsulated and sent between the first host and the second host using an overlay channel between a first endpoint of the overlay channel on the first host and a second endpoint of the channel on the second host.

In some embodiments, the packet includes a destination address of the active workload, and the destination address is used to look up the next hop of the first address in the local route table.

In some embodiments, addresses of the first endpoint and the second endpoint of the overlay channel do not change due to the migration of the active workload; and the encapsulated packet is sent through an underlay network using underlay route table that includes a route with the address of the second endpoint.

In some embodiments, the control message is received on a control channel that sends control messages between a first local process on the first host and a second local process on the second host, and the second local process reprograms the local route table.

In some embodiments, the packet comprises a first packet, the instructions further operable for: receiving an encapsulated second packet from the active workload for the standby workload through the overlay channel, wherein the second packet is sent using a next hop of a second address of an interface of a logical router that is coupled to the first endpoint on the first host.

In some embodiments, the local route table previously included a policy with the next hop of a second address to use to reach the active workload on the another host.

In some embodiments, the active workload is an active edge services gateway device that processes north-south traffic, and the standby workload is an edge services gateway device capable of becoming the active edge services gateway device upon determining a failure of the active workload using the liveness check of the active workload.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   receiving, at a first host, a control message from a second host, wherein the control message includes a first address to use as a next hop to reach an active workload that has migrated to the second host from another host;
   in response to receiving the control message, configuring a local route table to change a policy to send packets with the next hop from a second address to the first address, wherein the packets are sent to check whether a failure of the active workload has occurred and a standby workload should take over as the active workload; and
   sending a packet from the standby workload to the active workload using the first address as the next hop based on the change in the policy in the local route table to check whether the failure of the active workload has occurred, wherein the packet is encapsulated and sent between the first host and the second host using an overlay channel between a first endpoint of the overlay channel on the first host and a second endpoint of the channel on the second host.

2. The method of claim 1, wherein:
   the packet includes a destination address of the active workload, and
   the destination address is used to look up the first address as the next hop in the local route table.

3. The method of claim 1, wherein:
   addresses of the first endpoint and the second endpoint of the overlay channel do not change due to the migration of the active workload; and
   the encapsulated packet is sent through an underlay network using an underlay route table that includes a route with the address of the second endpoint.

4. The method of claim 1, wherein:
the control message is received on a control channel that sends control messages between a first local process on the first host and a second local process on the second host, and
the second local process reprograms the local route table.

5. The method of claim 1, wherein the packet comprises a first packet, the method further comprising:
receiving an encapsulated second packet from the active workload for the standby workload through the overlay channel, wherein the encapsulated second packet is sent using a third address as the next hop, wherein the third address is an interface of a logical router that is coupled to the first endpoint on the first host.

6. The method of claim 1, wherein the local route table previously included a policy with the next hop of the second address to use to reach the active workload on the another host.

7. The method of claim 1, wherein:
the active workload is an active edge services gateway device that processes north-south traffic, and the standby workload is an edge services gateway device capable of becoming the active edge services gateway device upon determining a failure of the active workload using the liveness check of the active workload.

8. A non-transitory computer-readable storage medium containing instructions, that when executed, control a computer system to be operable for:
receiving, at a first host, a control message from a second host, wherein the control message includes a first address to use as a next hop to reach an active workload that has migrated to the second host from another host;
in response to receiving the control message, configuring a local route table to change a policy to send packets with the next hop from a second address to the first address, wherein the packets are sent to check whether a failure of the active workload has occurred and a standby workload should take over as the active workload; and
sending a packet from the standby workload to the active workload using the first address as the next hop based on the change in the policy in the local route table to check whether the failure of the active workload has occurred, wherein the packet is encapsulated and sent between the first host and the second host using an overlay channel between a first endpoint of the overlay channel on the first host and a second endpoint of the channel on the second host.

9. The non-transitory computer-readable storage medium of claim 8, wherein:
the packet includes a destination address of the active workload, and
the destination address is used to look up the first address as the next hop in the local route table.

10. The non-transitory computer-readable storage medium of claim 8, wherein:
addresses of the first endpoint and the second endpoint of the overlay channel do not change due to the migration of the active workload; and
the encapsulated packet is sent through an underlay network using an underlay route table that includes a route with the address of the second endpoint.

11. The non-transitory computer-readable storage medium of claim 8, wherein:
the control message is received on a control channel that sends control messages between a first local process on the first host and a second local process on the second host, and
the second local process reprograms the local route table.

12. The non-transitory computer-readable storage medium of claim 8, wherein the packet comprises a first packet, the instructions further operable for:
receiving an encapsulated second packet from the active workload for the standby workload through the overlay channel, wherein the encapsulated second packet is sent using a third address as the next hop, wherein the third address is an interface of a logical router that is coupled to the first endpoint on the first host.

13. The non-transitory computer-readable storage medium of claim 8, wherein the local route table previously included a policy with the next hop of the second address to use to reach the active workload on the another host.

14. The non-transitory computer-readable storage medium of claim 8, wherein:
the active workload is an active edge services gateway device that processes north-south traffic, and the standby workload is an edge services gateway device capable of becoming the active edge services gateway device upon determining a failure of the active workload using the liveness check of the active workload.

15. A first host comprising:
one or more computer processors; and
a non-transitory computer-readable storage medium comprising instructions, that when executed, control the one or more computer processors to be operable for:
receiving a control message from a second host, wherein the control message includes a first address to use as a next hop to reach an active workload that has migrated to the second host from another host;
in response to receiving the control message, configuring a local route table to change a policy to send packets with the next hop from a second address to the first address, wherein the packets are sent to check whether a failure of the active workload has occurred and a standby workload should take over as the active workload; and
sending a packet from the standby workload to the active workload using the first address as the next hop based on the change in the policy in the local route table to check whether the liveness failure of the active workload has occurred, wherein the packet is encapsulated and sent between the first host and the second host using an overlay channel between a first endpoint of the overlay channel on the first host and a second endpoint of the channel on the second host.

16. The first host of claim 15, wherein:
the packet includes a destination address of the active workload, and
the destination address is used to look up the first address as the next hop in the local route table.

17. The first host of claim 15, wherein:
addresses of the first endpoint and the second endpoint of the overlay channel do not change due to the migration of the active workload; and
the encapsulated packet is sent through an underlay network using an underlay route table that includes a route with the address of the second endpoint.

18. The first host of claim 15, wherein:
the control message is received on a control channel that sends control messages between a first local process on the first host and a second local process on the second host, and
the second local process reprograms the local route table.

19. The first host of claim 15, wherein the packet comprises a first packet, the instructions further operable for:
receiving an encapsulated second packet from the active workload for the standby workload through the overlay channel, wherein the encapsulated second packet is sent using a third address as the next hop, wherein the third address is an interface of a logical router that is coupled to the first endpoint on the first host.

20. The first host of claim 15, wherein the local route table previously included a policy with the next hop of a second address to use to reach the active workload on the another host.

21. The first host of claim 15, wherein:
the active workload is an active edge services gateway device that processes north-south traffic, and the standby workload is an edge services gateway device capable of becoming the active edge services gateway device upon determining a failure of the active workload using the liveness check of the active workload.

* * * * *